Patented June 14, 1938

2,120,672

UNITED STATES PATENT OFFICE 2,120,672

CATALYTIC LIQUID PHASE OXIDATION OF AROMATIC HYDROCARBONS

Joseph R. Mares, St. Louis, Mo.

No Drawing. Application December 31, 1934, Serial No. 760,036

3 Claims. (Cl. 260—108)

This invention relates to the preparation of benzoic acid and it has particular relation to the preparation thereof by oxidation under alkaline conditions, of toluene with gaseous oxygen.

The main objects of the invention are to provide:

A catalytic liquid phase process of manufacturing benzoic acid directly from toluene and oxygen or air in which regeneration of the oxygen carrier as a separate step is obviated;

A process of preparing benzoic acid from toluene in which the formation of by-products resulting from the reaction of the oxygen carrier is substantially eliminated and in which the time and product losses involved in separating the benzoic acid from the by-products is reduced to a minimum; and, A process in which neutralization of free alkali with carbon dioxide is obviated.

It has heretofore been proposed to prepare benzoic acid by side chain oxidation of liquid toluene with a molar equivalent of an oxygen carrier such as sodium or potassium chromate or dichromate. This process is objectionable because the chromate employed as the oxygen carrier is relatively expensive and must be used in stoichiometric proportions. To discard this material after it has once been used, of course, involves a loss and if it is regenerated for further use the process involves transfer of the material to an autoclave and subjection to a relatively prolonged process of oxidation, etc. As a result, the expense involved even in re-generation and subsequent re-use of the material is great.

The reaction also results in decomposition of the chromate to form chromic oxide or hydroxide. This material exists as a voluminous solid in the reaction product and must be separated and recovered by filtration. The enormous volume thereof resulting from stoichiometric use of the chromate renders the step of separation and handling relatively expensive.

Furthermore, in the process of oxidizing the toluol to benzoic acid large amounts of alkali are liberated as shown by the reactions:

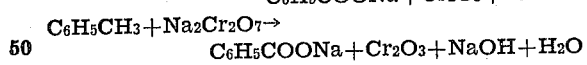

This alkali is objectionable because it tends to retard the speed of the reaction and accordingly it has been proposed to neutralize it by passing carbon dioxide into the reaction autoclave which, of course, involves an additional element of expense and operative control.

The present invention involves a process of oxidizing toluene to form benzoic acid directly by the use of oxygen or an oxygen carrying gas such as air. In this process the use of stoichiometric quantities of oxygen carriers, such as sodium chromate or dichromate, is obviated. The oxygen carrier is used in relatively small amounts and acts primarily in a catalytic capacity. It may be recovered at the end of the reaction for re-use without further treatment.

The reaction is conducted in the presence of water which may include a small amount of a wetting or demulsifying agent as the sodium salt of butylated and sulfonated diphenyl, abietiene sulfonic acid, Turkey red oil, or sodium salt of isobutyl naphthalene sulfonic acid. These function to increase the intimacy of contact between the water, toluol, soda and catalyst. Caustic soda, or preferably soda ash, is also added for purposes of combining with the benzoic acid as it is formed, to produce the alkali benzoate.

The following constitutes a specific application of the principles of the invention: Approximately ten parts by weight of toluene and a half mol. equivalent of soda dissolved in fifty to sixty parts of water are charged into an autoclave equipped with an efficient agitator. An appropriate amount of sodium chromate or dichromate is also added to catalyze the reaction. The amount of catalyst is not critical and in the case of sodium dichromate may range from 0.3 part to 1.5 parts or less. In the case of the sodium chromate the range may, for example, be from 0.4 to 1.2 parts. A wetting agent, e. g. the sodium salt of butylated and sulfonated diphenyl, or an emulsifying agent is now added to form a 2% or 3% solution with the water, although its use is not essential. The reaction is then initiated by heating the autoclave to a temperature of about 200° C. to 370° C., preferably of the order of 275° C.–300° C. while air or oxygen is admitted slowly. The resulting pressure will vary with the temperature, but will range from approximately 500 to 1400 or 1500 pounds per square inch. In case air is employed for purposes of oxidation it is conducted into the reaction chamber at a convenient rate and exhausted therefrom through a condenser to scrub the nitrogen rich gas mixture of its toluol. The slower the air is added the more complete will be the removal of the oxygen contained therein. Before the gases are discharged from the autoclave they pass through a condenser to remove any water or toluol. Residual toluol is finally conserved after exhausting the vapors containing the same from the autoclave by scrubbing with a conventional absorbent for toluol.

Unless the soda has been added to the original charge in the autoclave and in order to maintain the reaction it is necessary to add alkali or caustic for purposes of neutralizing the benzoic acid and preventing it from using up the alkali required by the chromate catalyst. A material excess of caustic soda should be avoided. Therefore, the addition of this reagent, if used in lieu of soda, should be at such rate and in such quantity as to maintain the reaction mass in a state of slight alkalinity or approximate neutrality. This state is readily determined by testing small samples from the autoclave from time to time with a suitable indicator and making such changes in the rate of feed of alkali as may be required. It will be appreciated that either free alkali, such as sodium hydroxide or potassium hydroxide, or the readily decomposable salts, such as sodium or potassium carbonates, may be employed for purposes of neutralization. The addition of alkali is effected in solution form; the make-up water employed to compensate for losses through evaporation may be used as the solvent.

The reaction is continued until substantially all of the toluol present has been transformed into benzoic acid or the benzoic acid salt. This may be determined by testing the effluent gases from the reaction to ascertain when the absorption of oxygen substantially ceases or by testing to determine when the escape of toluene vapors ceases.

After completion of the reaction the ingredients should be allowed to cool down to a temperature which will admit of their filtration for purposes of removing the catalyst which consists largely of chromium hydroxide. The latter substance may be returned immediately after recovery to the autoclave without further intermediate treatment. The salt of benzoic acid may then be recovered by concentration and crystallization, after which the mother liquor containing the excess carbonate is returned or the mixture may be acidified to liberate the free benzoic acid. The latter on cooling separates out as a pure white crystalline material.

In this process it will be appreciated that the catalyst is employed in materially less than stoichiometric quantities and the labor involved in filtering it from the reaction mass is thus greatly reduced. Also, since the volume of catalyst is relatively small, the size of the autoclave may be reduced from that heretofore employed where sodium chromate or dichromate are employed in stoichiometric quantities. There is a further saving of labor and time by reason of the fact that the catalyst, unlike the dichromate or chromate as heretofore employed as oxygen carriers does not require regeneration. There is thus a great saving in the steps of handling the material. The catalyst does not lose alkali as in the processes heretofore employed and therefore there is no necessity for the addition of carbon dioxide for purposes of eliminating it.

The above process has been described as involving the use of air for purposes of oxidation. This gas, of course, includes great volumes of nitrogen. It is also quite feasible to employ pure or substantially pure oxygen for purposes of conducting the reaction. Where this gas is used there is no escape of nitrogen gas and, of course, as a result, there is no loss by volatilization and sweeping away of toluene and water. Accordingly, the addition of these ingredients to the reaction for purposes of compensating for materials carried away is obviated. However, the addition of alkali to combine with the free benzoic acid is not obviated.

By substituting xylol for toluol and otherwise proceeding as described above, one obtained a mixture of methyl substituted benzoic acids and the corresponding ortho, meta and para benzenedicarboxylic or phthalic acids, which are known under the common names of phthalic, isophthalic and terephthalic acids, respectively.

What I claim is:

1. A method of oxidizing a methyl substituted benzene to the corresponding acid which comprises subjecting the hydrocarbon to the action of an aqueous solution of an inorganic basic substance and an oxygen-containing gas in the presence of a catalytic material which, at the initiation of the reaction, consists of an alkali chromate, while maintaining a temperature of approximately 200° C.–370° C. to form the desired acid and simultaneously to maintain the chromium in catalytically active form.

2. The method which comprises subjecting toluene to the action of an aqueous solution of an inorganic basic substance and an oxygen-containing gas in the presence of a catalytic material which, at the initiation of the reaction, consists of an alkali chromate, while maintaining a temperature of approximately 200–370° C. to form the desired acid and simultaneously to maintain the chromium in catalytically active form.

3. A method of preparing benzoic acid from toluene which comprises contacting toluene under pressure substantially above atmospheric pressure and at a temperature of substantially 200–370° C. with an alkali metal chromate in substantially less than stoichiometric proportions, and in the presence of an aqueous solution of an inorganic basic substance and oxidizing the toluene to the desired acid and simultaneously restoring the chromium compound to catalytically active state by blowing air therethrough.

JOSEPH R. MARES.